US011474934B1

(12) United States Patent
Pereira

(10) Patent No.: US 11,474,934 B1
(45) Date of Patent: Oct. 18, 2022

(54) SOFTWARE DEVELOPMENT SYSTEMS FOR CREATION AND TESTING OF VOICE AND MESSAGING APPLICATIONS AND RELATED METHODS AND COMPUTERS

(71) Applicant: Bandwidth, Inc., Raleigh, NC (US)

(72) Inventor: Daniel Pereira, Bolivia, NC (US)

(73) Assignee: Bandwidth Inc., Raleigh, NC (US)

( * ) Notice: Subject to any disclaimer, the term of this patent is extended or adjusted under 35 U.S.C. 154(b) by 11 days.

(21) Appl. No.: 17/477,637

(22) Filed: Sep. 17, 2021

(51) Int. Cl.
*G06F 11/36* (2006.01)
*G06F 8/36* (2018.01)
*H04L 51/046* (2022.01)

(52) U.S. Cl.
CPC ............ *G06F 11/3688* (2013.01); *G06F 8/36* (2013.01); *G06F 11/3664* (2013.01); *G06F 11/3684* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 9,747,191 | B1* | 8/2017 | Marolia | H04L 67/1095 |
| 10,834,265 | B1* | 11/2020 | Antunes | H04L 65/1073 |
| 11,099,973 | B2* | 8/2021 | Catt | G06F 16/9038 |
| 2010/0313185 | A1* | 12/2010 | Gupta | G06F 9/455 |
| | | | | 717/124 |
| 2013/0167123 | A1* | 6/2013 | Dura | G06F 11/3624 |
| | | | | 717/127 |
| 2017/0286269 | A1* | 10/2017 | Furman | G06F 11/3414 |
| 2020/0310945 | A1* | 10/2020 | Scoda | G06F 3/0484 |
| 2020/0356349 | A1* | 11/2020 | Jain | G06F 8/20 |
| 2020/0389419 | A1* | 12/2020 | Kulkarni | H04L 43/55 |
| 2021/0089433 | A1* | 3/2021 | Mattar | A63F 13/69 |

(Continued)

OTHER PUBLICATIONS

TechTarget, "telecommunications (telecom)", 2022, Published at https://www.techtarget.com/searchnetworking/definition/telecommunications-telecom (Year: 2022).*

(Continued)

*Primary Examiner* — Hossain M Morshed
(74) *Attorney, Agent, or Firm* — Gregory Stephens; Stanek Lemon Crouse + Meeks; Greg Stephens

(57) ABSTRACT

A software development system is provided for creating and testing applications. The software development system includes a non-transitory computer-readable medium and a processor in communication with the medium. The processor is configured to create voice and/or messaging applications for use in a telecommunication system; provide the created voice and/or messaging applications to a voice/messaging server in a test environment through the telecommunications system, wherein the voice/messaging server in the test environment loads the created voice and/or messaging application into the server to test the created voice and/or messaging application therein; directly interact with the created voice/messaging application loaded onto the server in the test environment using a virtual test device embedded in the software development system to execute test scripts associated with the created voice/messaging application in the test environment; and directly receive test results associated with the created voice/messaging application from the server at the software development system.

19 Claims, 6 Drawing Sheets

(56) References Cited

U.S. PATENT DOCUMENTS

| | | | |
|---|---|---|---|
| 2021/0149648 A1* | 5/2021 | Velammal | G06N 20/00 |
| 2021/0271456 A1* | 9/2021 | Dai | G06F 8/33 |
| 2021/0303442 A1* | 9/2021 | Chenguttuvan | G06F 11/368 |
| 2021/0400512 A1* | 12/2021 | Agarwal | H04M 7/0078 |

OTHER PUBLICATIONS

Testing Fundamental, "Test Script", 2020, Published at https://softwaretestingfundamentals.com/test-script/ (Year: 2020).*
Kay, "Rich Internet Applications", 2009, Published at https://www.computerworld.com/article/2551058/rich-internet-applications.html (Year: 2009).*
Bo, "MobileTest: A Tool Supporting Automatic Black Box Test for Software on Smart Mobile Devices", 2007, IEEE (Year: 2007).*

* cited by examiner

SOFTWARE DEVELOPMENT SYSTEMS FOR CREATION AND TESTING OF VOICE AND MESSAGING APPLICATIONS AND RELATED METHODS AND COMPUTERS

FIELD

The present inventive concept generally relates to telecommunications networks and, more particularly, development and testing of voice and messaging applications for use in a telecommunication network.

BACKGROUND

Software developers generally create applications and programs in a development environment. The development environment may include a collection of procedures and tools for developing, testing and debugging the application or program. Testing of voice and messaging applications for use with electronic devices may present a problem during testing as an actual electronic device unrelated to the development environment/test environment is generally used to execute the tests. Use of these unrelated electronic devices may introduce various anomalies into the environment as well as provide unreliable results.

SUMMARY

Some embodiments of the present inventive concept provide a software development system for creating and testing voice and/or messaging applications. The software development system includes a non-transitory computer-readable medium and a processor in communication with the non-transitory computer-readable medium. The processor is configured to create voice and/or messaging applications for use in a telecommunication system; provide the created voice and/or messaging applications to a voice/messaging server in a test environment through the telecommunications system, wherein the voice/messaging server in the test environment loads the created voice and/or messaging application into the server to test the created voice and/or messaging application therein; directly interact with the created voice/messaging application loaded onto the server in the test environment using a virtual test device embedded in the software development system to execute test scripts associated with the created voice/messaging application in the test environment; and directly receive test results associated with the created voice/messaging application from the server in the test environment at the software development system.

Related methods and computers are also provided.

DETAILED DESCRIPTION OF EMBODIMENTS

Figure 1:
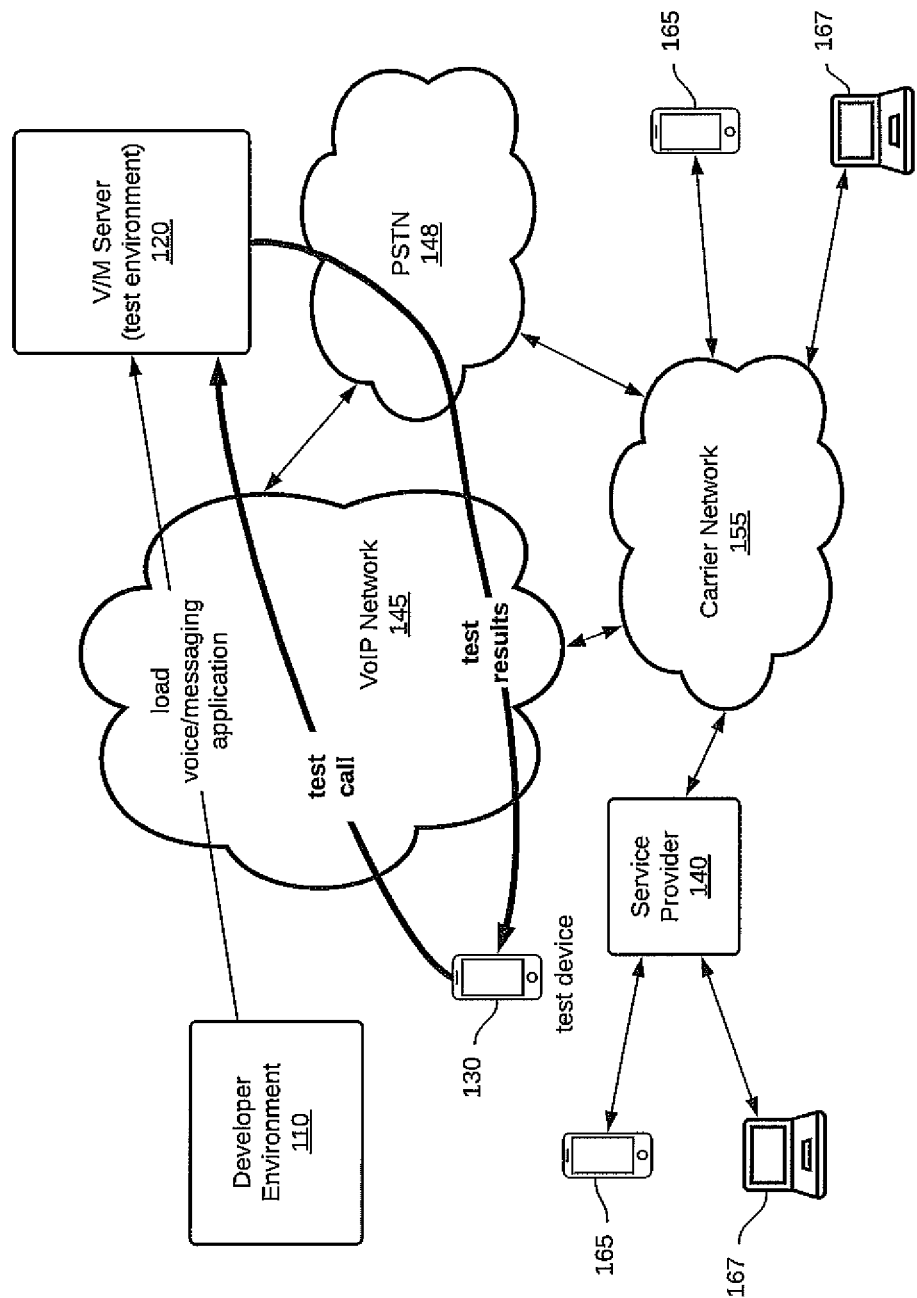
FIG. 1 is a block diagram illustrating a conventional system including a developer environment.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions In other words, A or B or C includes any or all of the following alternative combinations as appropriate for a particular usage: A alone, B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, software developers generally create applications and test scripts in a development environment. The development environment may include a collection of procedures and tools for developing, testing and debugging the application or program. Testing of applications and programs for use with an electronic device may present a problem during testing as an actual electronic device unrelated to the development environment is generally used to execute test scripts. Use of these unrelated electronic devices may introduce various anomalies into the environment as well as provide unreliable results.

A conventional system including use of an external, unrelated electronic device for executing test scripts and other testing will now be discussed with respect to FIG. 1. As illustrated, FIG. 1 is a block diagram illustrating an example conventional system 100 including a voice over internet protocol (VoIP) network 145; a public switched telephone network (PSTN) 148; a carrier network 155; a service provider 140; a developer environment 110; a voice/message server 120 in a test environment; a test device 130 and a plurality of endpoints 165 and 167 in communication with the carrier network 155 and/or the service provided service provider 140 in accordance with some embodiments discussed herein. It will be understood that although only a single carrier network 155 is shown in FIG. 1, embodiments of the present inventive concept are not limited to one carrier network, multiple carrier networks may be present in accordance with embodiments discussed herein.

The VoIP network 145 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The plurality of endpoints may include an internet of things (IoT) endpoint 165 and/or a telephony endpoint 167. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VoIP phone, IoT device, or another telephonic device. The endpoints 165 and 167 communicate through the networks 145 and 148 and the Carrier 155.

As used herein, the term "carrier" or "telecommunications carrier" may refer to any provider of telecommunications services. FIG. 1 also includes a service provider 140. It will be understood that the carrier 155 may be a service provider, for example, Bandwidth, Verizon, AT&T and the like. However, the reverse is not true, a service provider 140 is not necessarily a carrier. In embodiments where the service provider 140 is not a carrier, the service provider 140 may be a customer of the Carrier. FIG. 1 illustrates, the service provider 140 being a customer of the carrier 155. It will be understood that although the service provider 140 is shown as only being a customer of the Carrier 155, embodiments of the present inventive concept are not limited thereto. The service provider 140 may be customer of other Carriers or there may be additional service providers in the system 100 without departing from the scope of the present inventive concept.

As further illustrated in FIG. 1, the system 100 includes a developer environment (DE) 110, a voice/message server 120 located, for example, in a test environment, and a test device 130 that is separate from the DE 110 and unrelated to the DE 110. In some embodiment, the DE 110 may be a visual programming tool that includes a variety of preprogrammed modules that can be dragged and dropped to create, for example, a voice application or a messing application. These two types of applications will be referred to herein as a "voice/messaging" applications which will be understood to indicates one or both of these types of applications. The preprogrammed modules make up the voice/messaging application that is tested in the test environment. It will be understood that embodiments are not limited to using modules to build applications, voice/messaging applications may be created using traditional programing methods without departing from the scope of the present inventive concept. As illustrated in FIG. 1, when the application to be tested is sent to the test environment 120, the separate test device 130 is used to test the features of the application but the test device executes the tests through the VoIP network 145. Then, test results are returned to the test device 130 itself through the PSTN 148 and/or VoIP 145 networks, not to the DE 110. It will be understood that the test device 130 may be any one of the endpoints 165 and 167 discussed above without departing from the scope of the present inventive concept.

Using a test device 130 that is separate from and unrelated to the DE 110 may present multiple undesirable anomalies into the test environment. For example, use of an unrelated device 130 causes the test to be performed without any ability to trace the test or record the performance thereof. Furthermore, many times, the electronic device 130 being used belongs to the developer himself/herself or someone else present in the lab at the time and, thus, the company has no control of the particular device being used during the test. In other words, the company does not select the carrier associated with the device 130 executing the test, the type of device and the like, which leads to questionable results. Furthermore, using external devices makes testing scenarios involving multiple phones, for example, testing of a conferencing system including multiple users calling in at a same time, more difficult. In these situations, the developer is forced to enlist his colleagues to perform the test, which again introduces additional devices that are not under the company's control, leading to results that may be questionable.

Accordingly, some embodiments of the present inventive concept provide a virtual test device, for example, a soft phone, embedded in the developer environment (DE). As used herein, "software development system" is used to refer to a developer environment and the terms may be used interchangeably. Embedding the virtual test device in the DE 110 allows the software and/or application programs, for example, voice/messaging applications, to be tested using a "device" completely under the company's control. Furthermore, the virtual test device can emulate more than one call at a time mimicking a conference call without enlisting a variety of external electronic devices. Thus, some embodiments of the present inventive concept provide a virtual test device that produces traceable and replicable results controlled by the company as will be discussed further herein.

Figure 2:
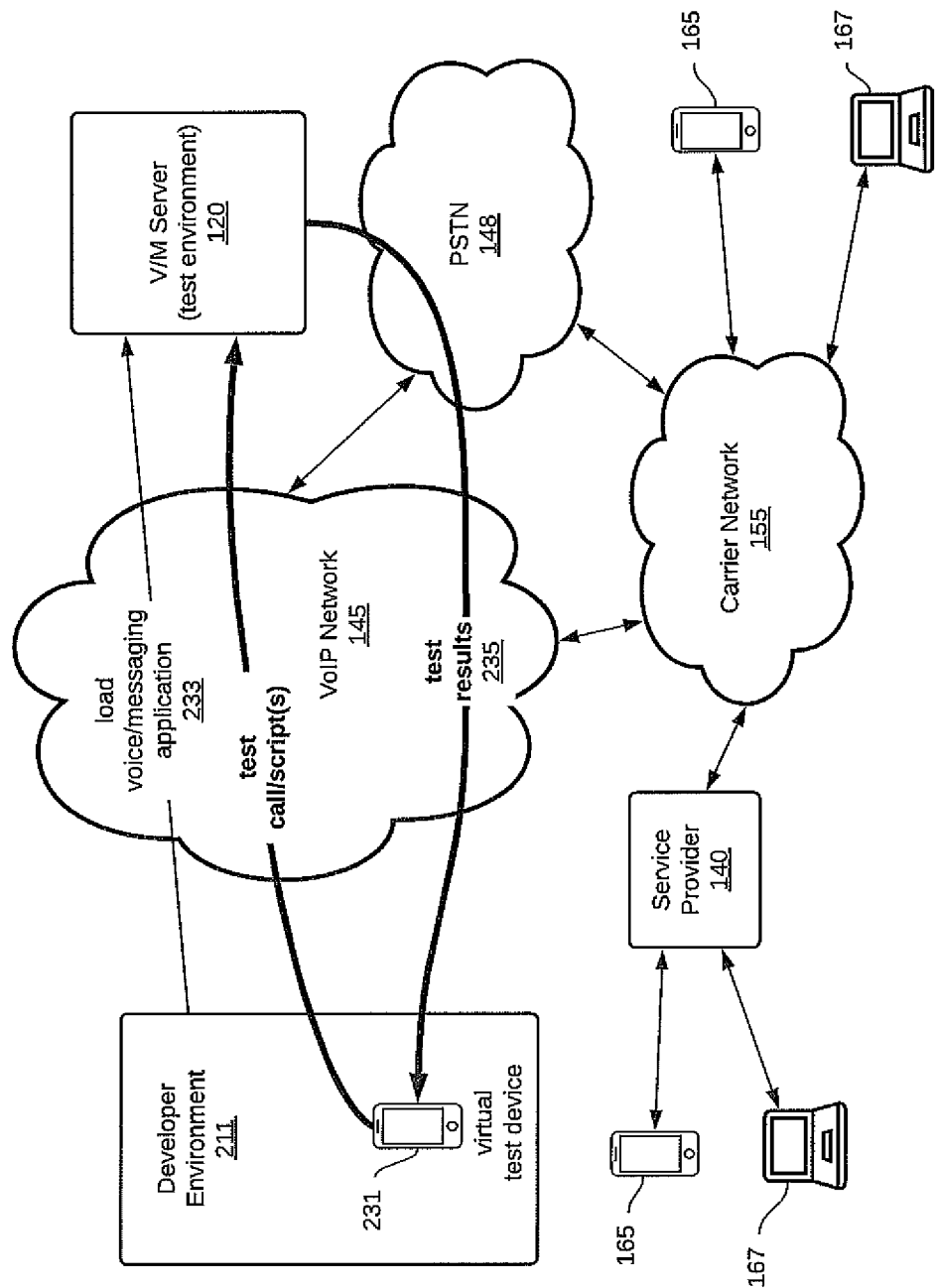
FIG. 2 is a block diagram illustrating a system including a developer environment including a virtual test device in accordance with some embodiments of the present inventive concept.

Referring now to FIG. 2, a system 200 including a DE 211 having an embedded virtual test device 231 therein in accordance with some embodiments of the present inventive concept will be discussed. It will be understood that like reference numerals refer to like elements throughout. Thus, the elements of the system discussed above with respect to FIG. 1 will not be repeated herein in the interest of brevity. However, as illustrated in FIG. 2, the DE 211 further includes a virtual test device 231 embedded within the DE 211, i.e. in the tool itself, in accordance with some embodiments discussed herein. Embedding the virtual test device 231 into the DE 211 makes the need for handheld devices to be used in the testing process unnecessary as a real "soft" phone may be included as part of the tool itself. The virtual test device 231 may emulate any electronic device know to those of skill in the art without departing from the scope of the present inventive concept. For example, in some embodiments, the virtual test device 231 may emulate a portable electronic device, such as a cell phone. Thus, the virtual test device 231 is embedded in the DE 211 and, therefore, the owner of the DE 211 has control over the test device 231 and these tests can be recorded and traced. Having control of the test device and the environment and the ability to trace and record the results of the tests will lead to much more reliable results as will be discussed further herein.

An example method for creating and testing a voice/messaging application using the embedded virtual test device 231 will now be discussed with respect to FIG. 2. The developer creates, assembles or amends a voice/messaging application in the DE 211. As discussed above, in some embodiments, the developer can create the application using modules that already exist or can create new modules/code using traditional methods without departing from the scope of the present inventive concept. The voice/messaging application can be any type of voice/messaging application, for example, a menu to be presented to a caller when the caller contacts a particular business by phone. The menu may allow the caller to select one of a series of numbers to reach a particular person or department or the menu may ask the user to enter the first few letters of a last name of a person they are trying to reach. In further embodiments, the voice/messaging application may be a conference call environment, a two factor authentication application for security or the like. These examples do not limit embodiments of the present inventive concept, but are provided as illustrative examples only.

Once the voice/messaging application is completed/created in the DE 211, the voice/messaging application 233 is loaded into the voice/messaging server 120 in the test environment to perform tests on the voice/messaging application 233. A link may be created between the virtual test device 231 in the DE 211 and the voice/messaging application 233 that has been loaded into the test environment 120. Once linked, one or more test scripts to test features of the loaded application 233 may be executed using the virtual test device 231 in the DE 211. As illustrated in FIG. 2, the test results 235 are provided directly to the DE 211, unlike the conventional system of FIG. 1.

Since the virtual test device 231 is located in the DE 211 and the test results are received directly at the DE 211, the developer may use the test results to amend the details of the application while tests continue to run in the test environment. The amended application can then be loaded into the server 120 for testing as well. In some embodiments, these additional tests may be automated, removing the developer from the process. In other words, test code may be generated as each step of the application is created and/or amended.

The test results 235 may also be used to create new test scripts to be executed by the virtual test device 231. For example, the test results 235 may identify a feature of the voice/messaging application that is not functioning properly. The developer may use this information to create a new test script associated with that particular feature so that the error can be found and corrected before the voice/messaging application is made available to the customer.

Figure 3:
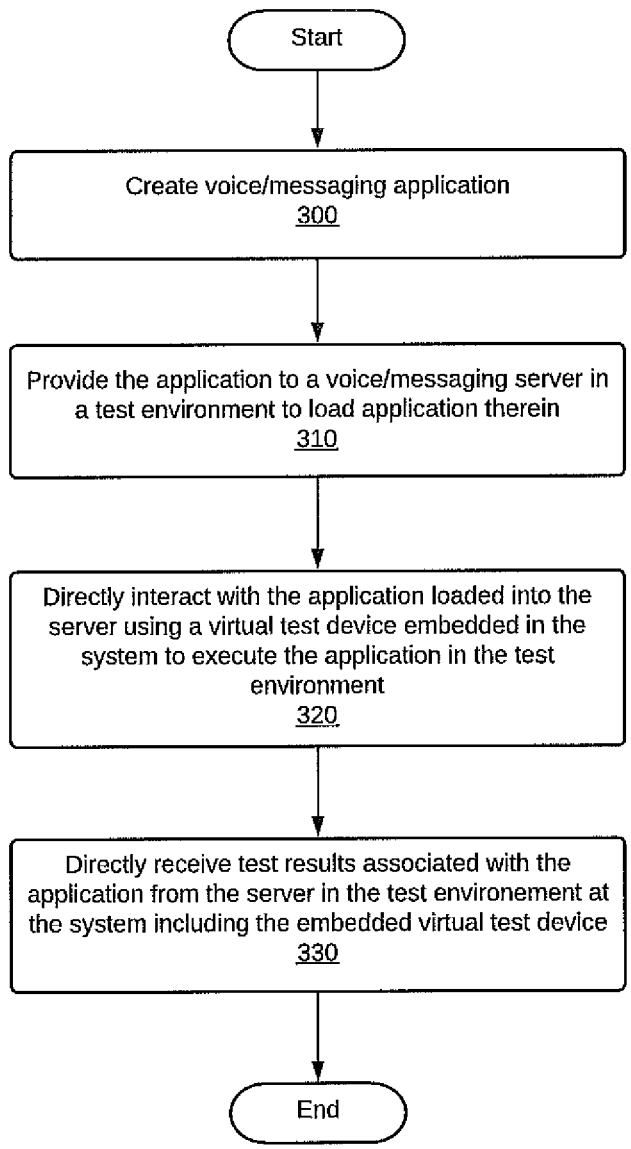
FIGS. 3 and 4 are flowcharts illustrating various operations in accordance with some embodiments of the present inventive concept.

Referring now to the flowcharts of FIGS. 3 and 4, operations in accordance with various embodiments of the present inventive concept will be discussed. Referring first to FIG. 3, operations for creating and testing voice and/or messaging applications in accordance with embodiments discussed herein begin at block 300 by creating voice and/or messaging applications for use in a telecommunication system. As discussed above, the developer uses the developer environment/software development system to create new voice and/or messaging applications. Once the voice/messaging applications are created, the created voice and/or messaging applications are provided to a voice/messaging server in a test environment through the telecommunications system (block 310). The voice/messaging server in the test environment loads the created voice and/or messaging application into the server to test the created voice and/or messaging application therein. Once loaded, a virtual test device embedded in the developer environment/software development system directly interacts with the created voice/messaging application loaded onto the server in the test environment by executing test scripts to test the created voice/messaging application in the test environment (block 320). The test results associated with the created voice/messaging application are received directly from the server in the test environment at the software development system (block 330). Thus, the loop from developer and test environment is closed and is controlled allowing test results to provide more accurate information. The received test results are recordable and traceable by the software development system allowing the created application to be amended to address issues that may have been found in one or more tests.

As discussed above, embedding a virtual test device in the environment itself eliminates the need for use of an external device in the testing process. Thus, the virtual test device may be used to, for example, emulate one or more electronic devices using the virtual test device embedded in the software development system to execute one or more voice calls or send one or more messages to the server in the test environment to facilitate testing of the voice/messaging application. Accordingly, when testing a conferencing application, all the calls can be initiated in the DE using the virtual test device and all calls can be routed and traced.

Figure 4:
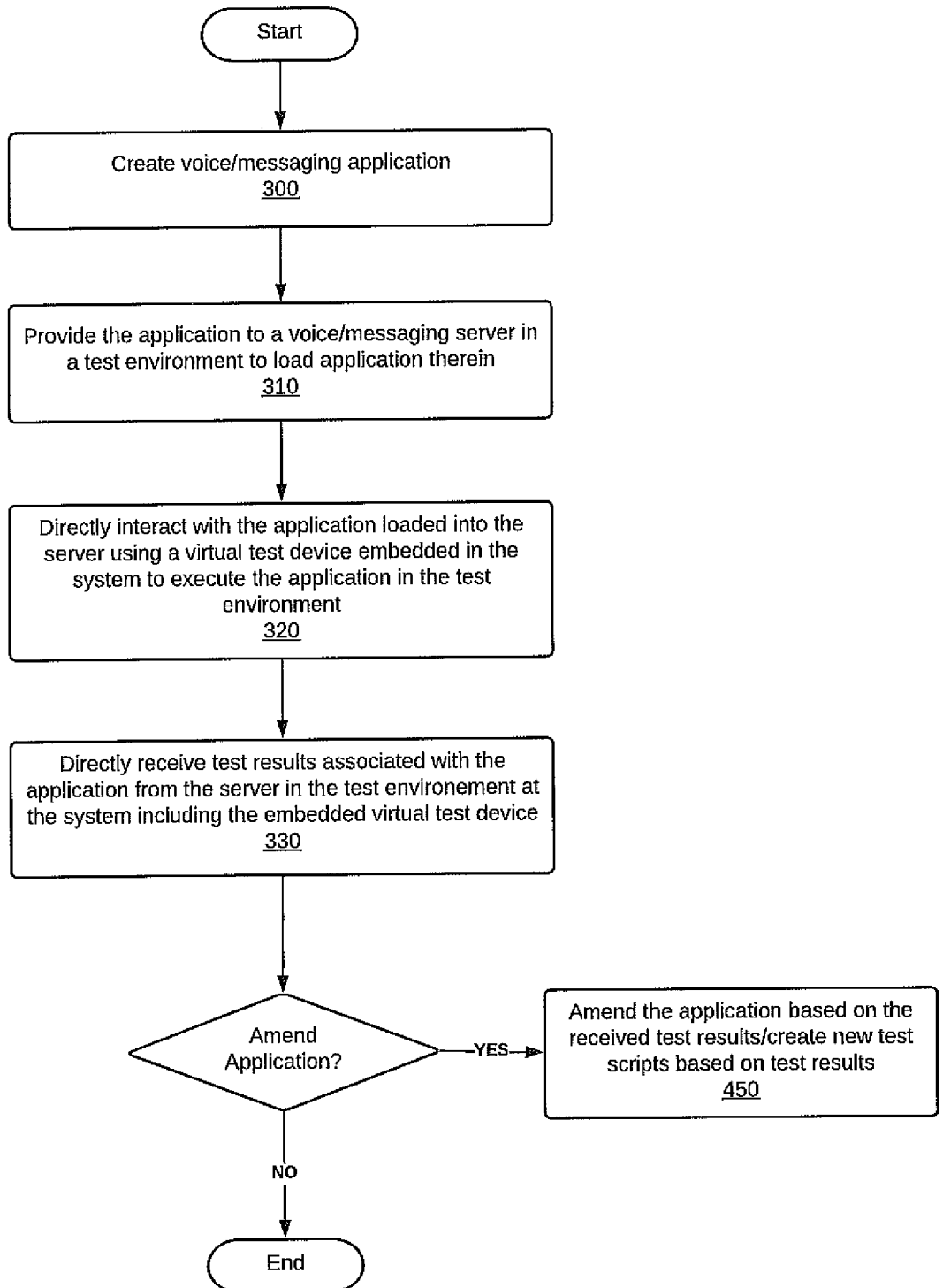

Referring now to FIG. 4, operations begin after block 330 by determining if an amendment to the voice/messaging application is needed based on the test results received directly from the server in the test environment (block 440). If it is determined that no amendments are needed (block 440), i.e., the application is working properly, then operations may cease. However, if it is determined from the test results that the application has glitches or bugs, the voice/messaging application may be amended in the DE (block 450) and reloaded into the server at block 310 and operations may repeat until it is determined that no amendments are needed to the voice/messaging application. It will be understood that the voice/messaging application may be amended and reloaded while tests are simultaneously conducted at the server in the test environment. Thus, the process of receiving test results at the software development system directly from the server, modifying or amending the voice/messaging application and testing the amended application is continuous until a determination is made that no further amendments are needed.

In addition to amending the voice/messaging application, the developer may use the test results returned to the DE is create new test scripts that may address issues identified by the first round of tests (block 450). These new test scripts may be used (executed by the virtual test device) to further test the voice/messaging application as it is amended and tested.

Providing the virtual test device in the DE itself can provide many advantages over prior solutions. In some embodiments, flows for particular applications/use cases may be created and tested at each level of the application. For example, in an answering application a user may be provided with a menu of options when the user calls a particular number, i.e. press 1 for a first person, press 2 for a second person, press 3 for the operator and the like. Embodiments of the present inventive concept allow results at each step to be logged and to trouble shoot problems identified at the flow level. What happens when the user presses 1?; should that have happened? If not, how can the problem be addressed? Etc. Embodiments of the present inventive concept allow this testing and debugging to happen in real time as the feedback loop is coming into the DE itself. In other words, the developer is not using his/her personal device to execute the tests. Having the embedded virtual test device allows the developer to keep the control of testing under organizational network control. As discussed above, the test results received directly at the DE may be used to both amend the voice/messaging application as well as to create new test scripts that further target areas of the voice/messaging application that been flagged as having a problem.

Embodiments of the present inventive concept may also facilitate trouble shooting customer complaints. For example, a customer may call and say that their phone numbers are not routing correctly. A technician may use the virtual test device embedded in the system and the dashboard to test the customer's numbers and may produce a report that can be shared with the customer. If the report shows that the customer's numbers are being routed correctly in the system, it may lead to location of the mistake somewhere else, for example, it may be a human entry error.

Similarly, the virtual test device embedded in the system may be used to test audio quality of the service. For example, a customer may call and complains of poor audio quality. The virtual test device may be used to make a call and the audio may be recorded and given a quality score. This information may be sent to the customer and the customer can take remedial action on the cause of the poor quality if it is not originating in the system.

Figure 5:
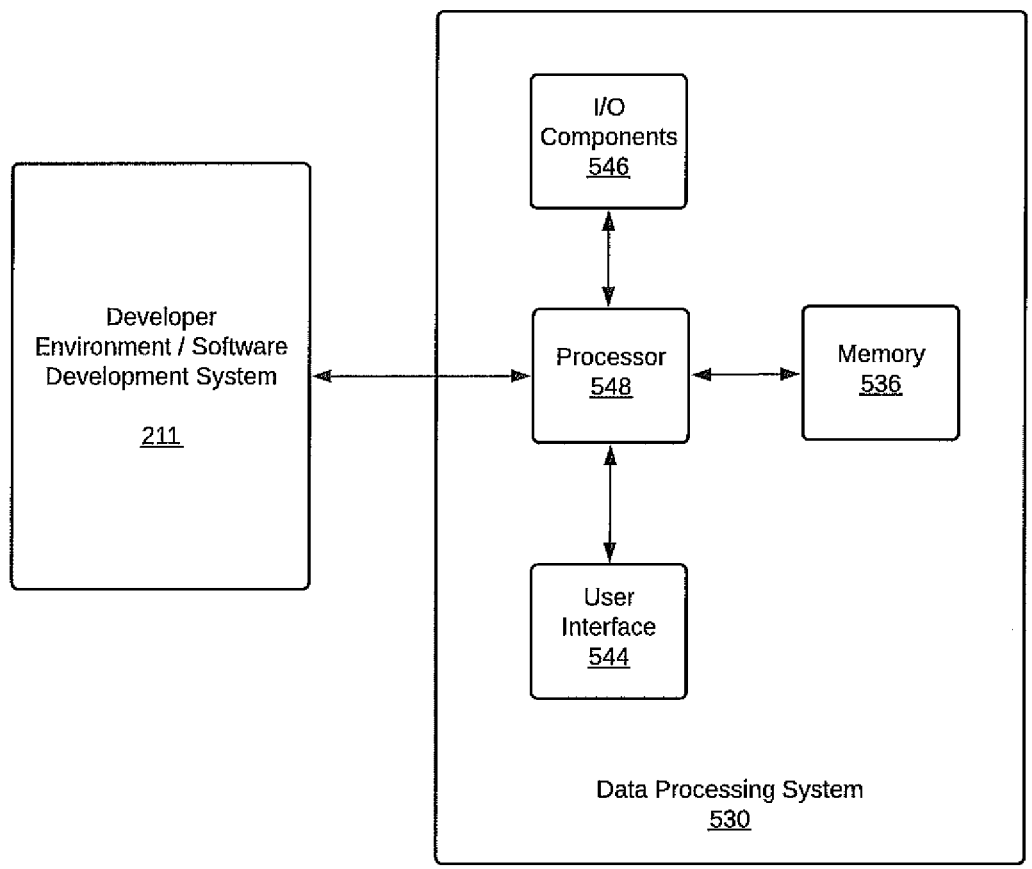
FIG. 5 is a block diagram of a data processing system for use in accordance with some embodiments of the present inventive concept.

Referring now to FIG. 5, an example of a data processing system 530 suitable for use with any of the examples described above. Although the example data processing system 530 is shown as in communication with DE 211 in accordance with embodiments of the present inventive concept, the data processing system 530 may be part of any component of the system without departing from the scope of the present inventive concept. In some examples, the data processing system 530 can be any suitable computing device for performing operations according to the embodiments discussed herein described herein.

As illustrated, the data processing system 530 includes a processor 548 communicatively coupled to I/O components 546, a user interface 544 and a memory 536. The processor 548 can include one or more commercially available processors, embedded processors, secure processors, microprocessors, dual microprocessors, multi-core processors, other multi-processor architectures, another suitable processing device, or any combination of these. The memory 536, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 530.

I/O components 546 may be used to facilitate wired or wireless connections to devices such as one or more displays, game controllers, keyboards, mice, joysticks, cameras, buttons, speakers, microphones and/or other hardware used to input or output data. Memory 536 represents non-volatile storages such as magnetic, optical, or other storage media included in the data processing system and/or coupled to processor 548.

The user interface 544 may include, for example, a keyboard, keypad, touchpad, voice activation circuit, display or the like and the processor 548 may execute program code or instructions stored in memory 536.

It should be appreciated that data processing system 530 may also include additional processors, additional storage, and a computer-readable medium (not shown). The processor(s) 548 may execute additional computer-executable program instructions stored in memory 536. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

Figure 6:
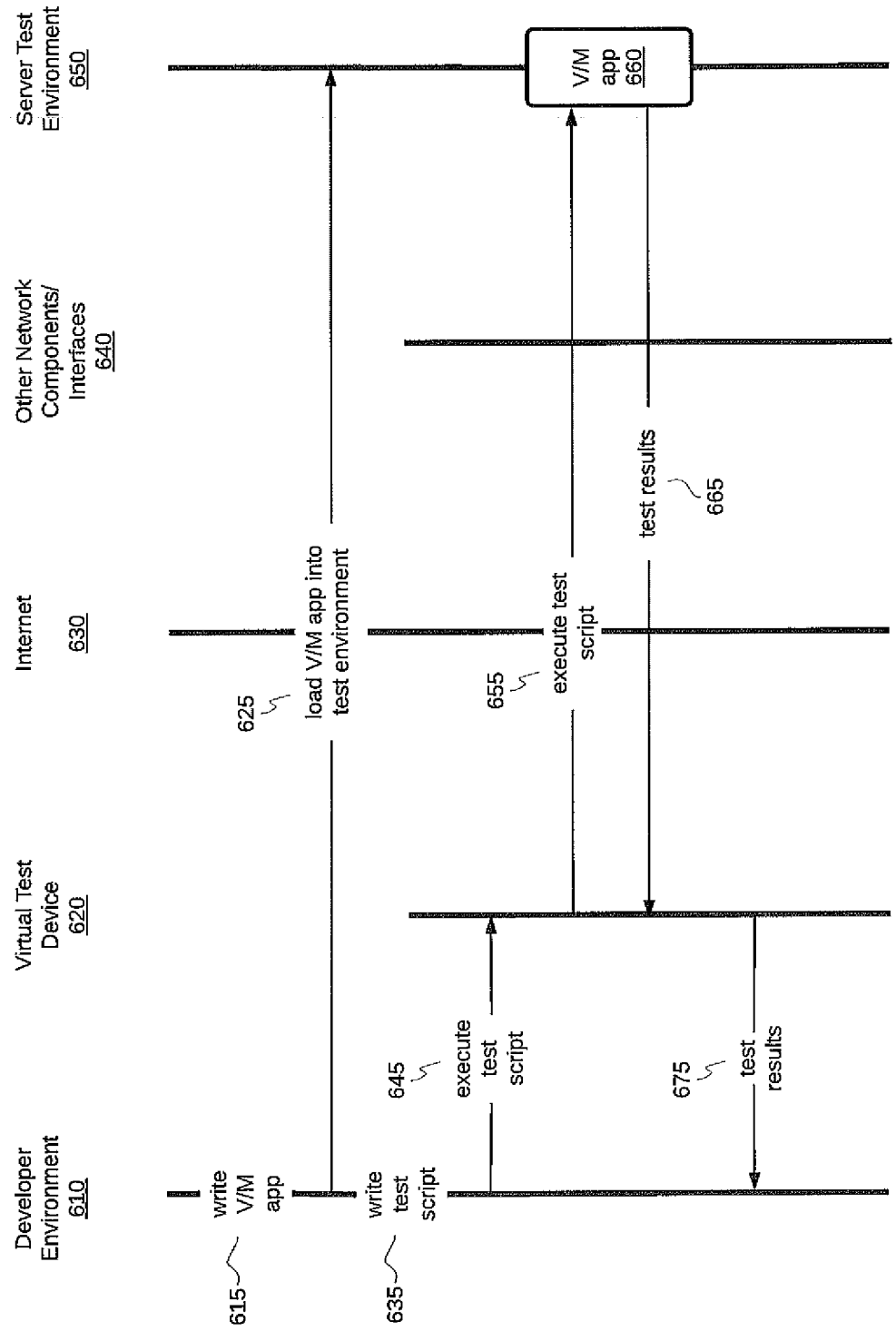
FIG. 6 is a diagram illustrating operations performed at various systems in accordance with some embodiments of the present inventive concept.

An example flow of operations in a system in accordance with some embodiments of the present inventive concept will now be discussed with respect to FIG. 6. As illustrated in FIG. 6, the various components of the system are similar to those discussed above with respect to FIG. 2. In particular, the components include a DE 610, a virtual test device 620 embedded in the DE 610, the internet 630, other network components/interfaces 640 and a server test environment 650. It will be understood that FIG. 6 is provided as an example only and that embodiments of the present inventive concept can include more or different components without departing from the scope of the present inventive concept.

As illustrated, operations begin at 615 by creating a voice/messaging application and loading the created voice/messaging application into the server test environment 650. The developer may then create one or more test scripts 635 directed to the created voice/messaging application 625 and execute these test scripts 645 using the virtual test device 620. As illustrated, the virtual test device 620 communicates directly with the server test environment 650 to execute the test script 645 for the voice/messaging application 660 loaded into the server test environment 650. The test results 665 are communicated between the server 650 and the virtual test device 620 but are also communicated back to the DE 610. The DE 610 can use the test results 675 to generate additional test scripts and/or to amend the application. Thus, as the application is being tested by executing test scripts, test results may be used to refine the application and create new test scripts at the same time.

As briefly discussed above, some embodiments of the present inventive concept provide a virtual test device embedded directly in the developer environment. Embedding the virtual test device into the DE allows more control over testing of voice/messaging applications as the virtual test device is controlled by the DE and receives test results directly from the test environment. The process for testing new applications may also be simplified and may be completed faster as multiple processes may be performed at a same time as discussed above.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A software development system for managing voice and/or messaging applications, the software development system comprising:

a non-transitory computer-readable medium;

a processor in communication with the non-transitory computer-readable medium, the processor configured to:

obtain a voice and/or messaging application for use in a telecommunication system, wherein when loaded by a computing system the voice and/or messaging application facilitates a transmission of voice content over a network;

provide the voice and/or messaging application to a testing server, wherein the testing server executes the voice and/or messaging application in a test environment;

during runtime of the voice and/or messaging application on the testing server, execute a set of test scripts to test a plurality of features of the voice and/or messaging application, wherein the set of test scripts comprises at least a first test script and a second test script, wherein execution of a particular test script of the set of test scripts causes a virtual test device embedded in the software development system to simulate at least one voice call to the testing server to facilitate testing of the voice and/or messaging application;

directly receive test results associated with execution of the first test script of the set of test scripts from the testing server;

amend the voice and/or messaging application based on the test results; and generate at least one additional test script based on the test results, wherein execution of the second test script of the set of test scripts occurs concurrently with at least one of the receipt of the test results, the amendment of the voice and/or messaging application, or the generation of the at least one additional test script.

2. The software development system of claim 1, wherein the virtual test device embedded in the software development system is controlled by the software development system such that the received test results are recordable and traceable by the software development system.

3. The software development system of claim 1, wherein the processor is further configured to repeatedly amend the voice and/or messaging application based on the test results received directly at the software development system to provide an updated voice and/or messaging application until it is determined that no further amendments are needed.

4. The software development system of claim 1, wherein the processor is further configured to amend the voice and/or messaging application while tests are simultaneously being conducted at the testing server in the test environment and test results are being received at the software development system directly from the testing server.

5. The software development system of claim 1, wherein the software development system provides a developer environment that facilitates creation of the voice and/or messaging application for use in the telecommunications system.

6. The software development system of claim 1, wherein the software development system provides a developer environment that facilitates creation of the voice and/or messaging application by providing modules that are combined to create the voice and/or messaging application.

7. The software development system of claim 1, wherein the processor is further configured to:

during runtime of an amended version of the voice and/or messaging application, execute the at least one additional test script.

8. A method for managing voice and/or messaging applications, the method comprising:

obtaining a voice and/or messaging application for use in a telecommunication system, wherein when loaded by a computing system the voice and/or messaging application facilitates a transmission of voice content over a network;

providing the voice and/or messaging application to a testing server, wherein the testing server executes the voice and/or messaging application in a test environment;

during runtime of the voice and/or messaging application on the testing server, executing a set of test scripts to test a plurality of features of the voice and/or messaging application, wherein the set of test scripts comprises at least a first test script and a second test script, wherein execution of a particular test script of the set of test scripts a virtual test device embedded in a software development system to simulate at least one voice call to the testing server to facilitate testing of the voice and/or messaging application;

directly receiving test results associated with execution of the first test script of the set of test scripts from the testing server;

amending the voice and/or messaging application based on the test results; and generating at least one additional test script based on the test results, wherein executing the second test script of the set of test scripts occurs concurrently with at least one of the said receiving the test results, said amending the voice and/or messaging application, or said generating the at least one additional test script.

9. The method of claim 8, further comprising controlling the virtual test device embedded in the software development system such that the received test results are recordable and traceable by the software development system.

10. The method of claim 8, further comprising:

repeatedly amending the voice and/or messaging application based on the test results received directly at the software development system; and repeatedly providing an updated voice and/or messaging application to the testing server in the test environment until it is determined that no further amendments are needed.

11. The method of claim 8, further comprising amending the voice and/or messaging application while simultaneously conducting tests at the testing server in the test environment and receiving test results at the software development system directly from the testing server.

12. The method of claim 8, wherein the software development system provides a developer environment that facilitates creation of the voice and/or messaging application for use in the telecommunications system.

13. The method of claim 8, further comprising creating the voice and/or messaging application by combining preprogrammed modules to create the voice and/or messaging application.

14. A computer for creating and testing voice and/or messaging applications, the computer comprising:

one or more memories;

one or more processors, communicatively coupled to the one or more memories, the one or more processors configured to:

obtain a voice and/or messaging application for use in a telecommunication system, wherein when loaded by a computing system the voice and/or messaging application facilitates a transmission of voice content over a network;

provide the voice and/or messaging application to at testing server, wherein the testing server executes the voice and/or messaging application in a test environment;

during runtime of the voice and/or messaging application on the testing server, execute a set of test scripts to test a plurality of features of the voice and/or messaging application, wherein the set of test scripts comprises at least a first test script and a second test script, wherein execution of a particular test script of the set of test scripts causes a virtual test device embedded in the computer to simulate at least one voice call to the testing server to facilitate testing of the voice and/or messaging application;

directly receive test results associated with execution of the first test script of the set of test scripts from the testing server; and amend the voice and/or messaging application based on the test results; and generate at least one additional test script based on the test results, wherein execution of the second test script of the set of test scripts occurs concurrently with at least one of the receipt of the test results, the amendment of the voice and/or messaging application, or the generation of the at least one additional test script.

15. The computer of claim 14, wherein the virtual test device embedded in the computer is controlled by the computer such that the received test results are recordable and traceable by the computer.

16. The computer of claim 14, wherein the one or more processors are further configured to repeatedly amend the voice and/or messaging application based on the test results received directly at the computer to provide an updated voice and/or messaging application until it is determined that no further amendments are needed.

17. The computer of claim 14, wherein the one or more processors are further configured to amend the voice and/or messaging application while tests are simultaneously being conducted at the testing server in the test environment and test results are being received at the computer directly from the testing server.

18. The computer of claim 14, wherein the computer provides a developer environment that facilitates creation of the voice and/or messaging application for use in the telecommunications system.

19. The computer of claim 14, wherein the computer provides a developer environment that facilitates creation of the voice and/or messaging application by providing modules that are combined to create the voice and/or messaging application.

* * * * *